Patented Aug. 30, 1932

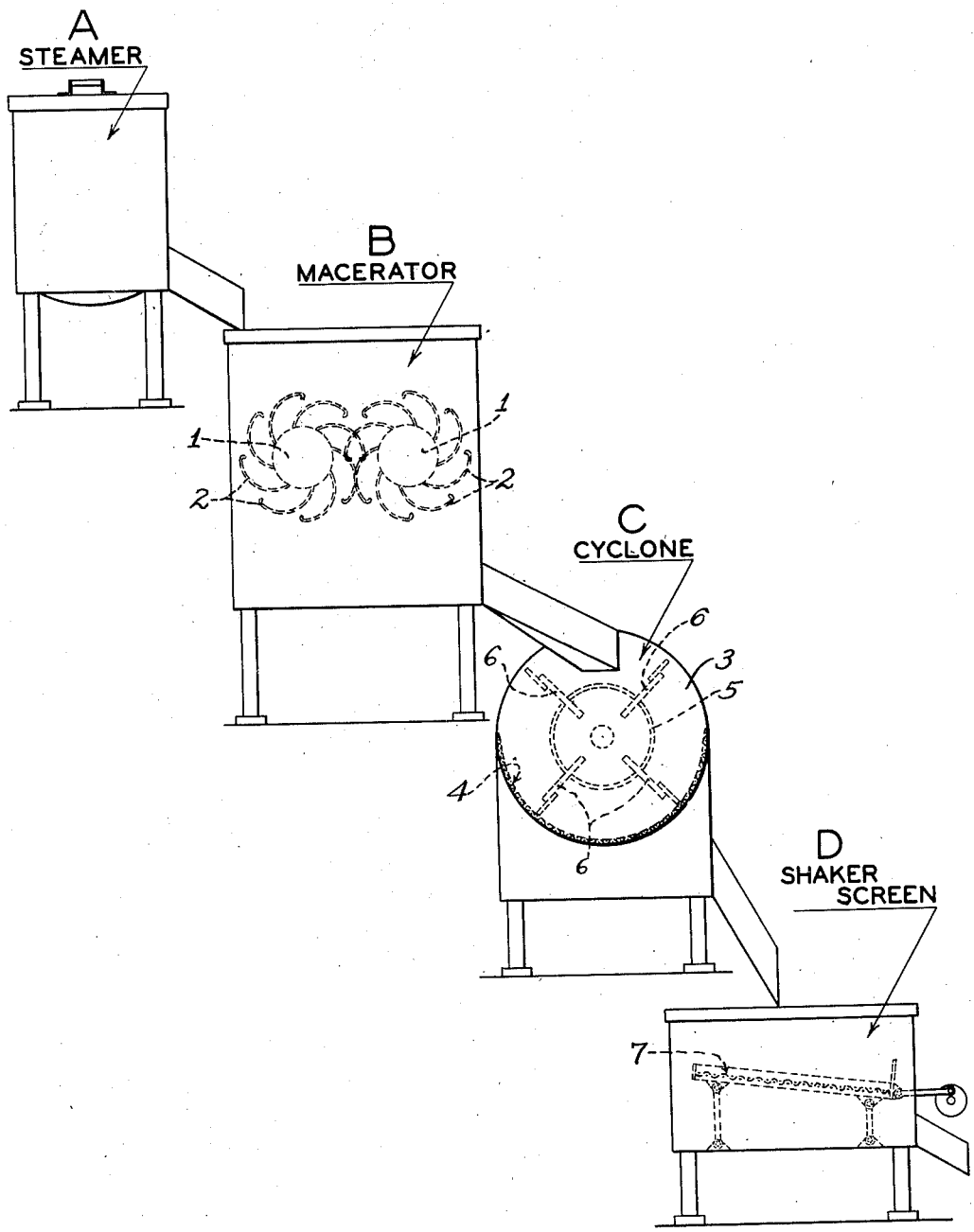

1,874,181

UNITED STATES PATENT OFFICE

WILLIAM H. GAVIN, OF SAN JOSE, CALIFORNIA, ASSIGNOR TO PRATT-LOW PRESERVING COMPANY, OF SANTA CLARA, A CORPORATION OF CALIFORNIA

PRODUCING TOMATO JUICE

Application filed December 29, 1930. Serial No. 505,236.

My invention relates to the production of tomato juice.

It has for its object both simplification of method and improvement of product.

In developing my process, I have had in mind the teachings of the prior art evolved from recent research and practise, seeking to place upon the market an acceptable tomato product, the essentials of which, as now decided upon, are flavor, color, and the preservation of vitamin C. These are now so well known that it will not be required herein to review them at any length, as it will be sufficient to refer to them generally at such points of contrast as may properly distinguish my invention.

The steps of my process, briefly stated, are, first, scalding the tomatoes in an atmosphere of steam; second, tearing them to pulpy condition; third, separating, by screening, the juice together with the pulp from the undesirable particles such as skins, seeds, cores, etc.; fourth, subjecting the separated juice and pulp to a second separation from such excess of the pulp as may be incapable of suspension in or homogenizing with the juice; and, fifth, treating the juice with its contained modicum of suspended pulp, to acceptable canning methods.

In this process, there is no squeezing of the fruit nor abnormally high pressures, tending to reduce the pulp to a finely divided state for suspension. The scalding step is at the normal steam pressure of about 212° F., and such stresses as exist in the tearing step, and in the succeeding separating steps, are merely the pressures of mechanical operation, and even these are modified, as I shall presently point out. The first, or scalding step, is carried out in any suitable steamer vessel. The second, or pulping step, is effected in a standard tearing machine, commonly known as a "macerator", comprising rotatable rolls with slender interlacing curved teeth. The third step in which the first separation takes place is carried out in a standard machine, known as a "cyclone" or "pulp rubber", and which comprises an open-ended screen-bottom cylinder, containing a rotating reel of paddles, adapted by wiping action upon the screen to pass the juice and pulp therethrough. The fourth step, in which the pulp content is reduced to proper amount and condition for suspension or in homogenizing with the juice, is effected upon a shaking screen from the surface of which the insoluble portion of the pulp is discarded, while the soluble portion thereof together with the juice pass through. Both in experiment and in practise, I have found in carrying out in the "cyclone" the first separation, that a decided benefit is had by materially reducing the speed of the screen-wiping paddles. I secure the best result by rotating them at about 290 per minute, which is relatively low when compared with 430 revolutions per minute, a speed at which it is customary to operate a cyclone. Why this benefit follows seems to warrant mostly conjecture herein. It is certain, however, that high speed has a curdling effect; but aside form this, whether the slower speed avoids other injury to the pulp; or whether it reduces by possible slower fanning action, the volume of air which at higher speed might tend to oxidize the vitamin C; or whether other reasons may be assigned, I cannot say; but of this I am confident, namely, that the relatively low speed of the screen-wiping separation of the cyclone is important in the production of marketable tomato juice.

The fourth step, involving the second separation also has a special feature. Because of its purpose to allow only so much of the pulp to pass through the shaker screen as will remain in suspension, to flavor and color the product, the size of the screen mesh must be considered. I have found that a mesh between 40 and 120 to the inch is a serviceable range, and, in practise, I have used with success a range between 60 and 80. Such a mesh I find allows pulp of a kind and amount to pass through as will remain in suspension and give to the juice the desired flavor and color. The screen is of standard wire cloth, mounted preferably at a slight angle and having imparted to it a shaking movement which may be either horizontal or vertical or both, though a horizontal shake is probably more desirable in tending to avoid injury to the screen.

With regard to both the separating effects, it will be noted that there is no squeezing action, which is not good for the production of marketable tomato juice, as it yields too much pulp. The action in the cyclone is one of gentle wiping, and that in the shaker is a mere screening.

In the accompanying drawing to which reference may be had for a full understanding of a suitable means for carrying out the process, the figure illustrates, more or less diametrically sufficient of the several devices to indicate their general nature.

At A is the steamer vessel.

At B is the macerator, comprising rotatable rolls 1, with slender curved overlapping or interlacing teeth 2.

At C is the "cyclone," comprising the cylinder 3 with screen bottom 4, and the rotatable reel 5 with paddles or blades 6.

At D is the shaker, comprising the screened frame 7 mounted for and having imparted to it a shaking movement.

I claim:—

The process of producing tomato juice comprising softening the fruit by steaming; then tearing it to a pulpy condition; then subjecting it to a relatively slow screen wiping effect adapted to separate the juice and pulp from other substances, and then subjecting said previously screened juice and pulp to a screen shaking effect adapted to separate therefrom the juice and such modicum of the pulp as in character and volume will homogenize with the juice to give to it desired flavor and color.

In testimony whereof I have signed my name to this specification.

WILLIAM H. GAVIN.